(12) United States Patent
Watts et al.

(10) Patent No.: US 11,833,583 B2
(45) Date of Patent: Dec. 5, 2023

(54) TAILORED PARTICLES FOR POWDER-BASED ADDITIVE MANUFACTURING

(71) Applicant: Lawrence Livermore National Security, LLC, Livermore, CA (US)

(72) Inventors: Seth Evan Watts, Collingswood, NJ (US); Nikola Dudukovic, Hayward, CA (US); Eric Duoss, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/841,769

(22) Filed: Jun. 16, 2022

(65) Prior Publication Data

US 2022/0305551 A1 Sep. 29, 2022

Related U.S. Application Data

(62) Division of application No. 16/507,700, filed on Jul. 10, 2019, now abandoned.

(51) Int. Cl.
| | |
|---|---|
| *B22F 1/05* | (2022.01) |
| *B33Y 70/00* | (2020.01) |
| *B22F 1/06* | (2022.01) |
| *B33Y 10/00* | (2015.01) |
| *B22F 10/00* | (2021.01) |

(52) U.S. Cl.
CPC ............. *B22F 1/06* (2022.01); *B33Y 10/00* (2014.12); *B33Y 70/00* (2014.12); *B22F 10/00* (2021.01)

(58) Field of Classification Search
None
See application file for complete search history.

(56) References Cited

U.S. PATENT DOCUMENTS

| | | | |
|---|---|---|---|
| 2004/0009089 | A1 | 1/2004 | Liu et al. |
| 2007/0172380 | A1 | 7/2007 | Tatsumoto et al. |
| 2015/0360288 | A1 | 12/2015 | Zalewski |
| 2016/0200045 | A1 | 7/2016 | Hopkins et al. |
| 2017/0209963 | A1 | 7/2017 | Smathers et al. |

FOREIGN PATENT DOCUMENTS

EP 3266593 A1 1/2018

OTHER PUBLICATIONS

International Search Report and Written Opinion regarding International Application No. PCT/US2019/041522 dated Apr. 8, 2020.
Armstrong, 2012, Physical Properties & Structure of Cells, https://www2.palomar.edu/users/warmstrong/lmexer1.htm, pp. 1-27 (Year: 2012).

*Primary Examiner* — Anthony M Liang
(74) *Attorney, Agent, or Firm* — HARNESS, DICKEY & PIERCE, P.L.C.

(57) ABSTRACT

The present disclosure relates to a plurality of powder particles configured to be joined in an additive manufacturing process to form a part. Each one of the powder particles has a determined three dimensional, non-spherical shape. The plurality of powder particles are further of dimensions enabling fitting individual ones of the powder particles in abutting relationship with one another. At least a subplurality of the powder particles each have a functionalized surface feature to enhance at least one of clustering or separation of the subplurality of powder particles.

19 Claims, 3 Drawing Sheets

TAILORED PARTICLES FOR POWDER-BASED ADDITIVE MANUFACTURING

CROSS REFERENCE TO RELATED APPLICATIONS

The present disclosure is a divisional of U.S. application Ser. No. 16/507,700, filed Jul. 10, 2019, which is presently pending, and the disclosure of which is hereby incorporated by reference into the present disclosure.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to feedstock materials used with additive manufacturing systems, and more particularly to powder feedstock materials having unique shapes, dimensions and material characteristics which significantly improve the densification of 3D parts and structures made using additive manufacturing processes.

BACKGROUND

The statements in this section merely provide background information related to the present disclosure and may not constitute prior art.

Additive manufacturing (AM) of parts comprised of one material or multiple materials, where the feedstock is comprised of one or more materials (or mixtures of materials) in a granular form. This may include, but is not limited to, powder-bed methods like selective laser melting (SLM), selective laser sintering (SLS), and binder jet printing, or methods in which the particles themselves are transported like electrophoretic deposition (EPD) and direct ink writing (DIW) with colloidal inks.

Powder-based additive manufacturing processes have historically only used spherical or near-spheroidal particles as feedstock material, since these are easiest to manufacture. Spherical or near-spherical powder, for example, is typically created by grinding a bulk material, by precipitation of particles from a solution, or by atomization of a molten sample. In powder-based additive manufacturing methods, the goal is to agglomerate these particles in locations of one's choosing to create a part. This can be accomplished in many ways, for example, by compacting the particles around an electrode in electrophoretic deposition ("EPD"), depositing them in a direct ink write ("DIW") operation, or by melting them together in selective laser melting ("SLM").

Regardless of the above operations employed, spheroidal particles cannot pack with 100% density. In fact, the theoretical maximum packing density for uniformly-sized spheres is only 74%, and randomly-packed spheres typically pack to only 64% density. The remaining void space manifests directly as porosity of the final part in some AM methods like EPD. The void space may contribute to residual stress formation in AM processes like SLM that involve phase change that can partially fill in the porous space. Even in this latter case, porosity remains to at least some degree, where it can nucleate cracks and otherwise contribute to degraded part performance and longevity.

Accordingly, further efforts to explore the design of particles for AM purposes is needed to reduce the porosity in AM constructed parts. Significantly reducing the porosity of such parts is expected to significantly improve the resistance to cracks which weaken the finished AM constructed 3D part.

SUMMARY

This section provides a general summary of the disclosure, and is not a comprehensive disclosure of its full scope or all of its features.

The present disclosure relates to a plurality of powder particles configured to be joined in an additive manufacturing process to form a part. Each one of the powder particles has a determined three dimensional, non-spherical shape. The plurality of powder particles are further of dimensions enabling fitting individual ones of the powder particles in abutting relationship with one another. At least a subplurality of the powder particles each have a functionalized surface feature to enhance at least one of clustering or separation of the powder particles.

In another aspect the present disclosure relates to a plurality of powder particles configured to be joined in an additive manufacturing process to form a part. Each one of the powder particles may comprise a determined three dimensional, non-spherical shape. The non-spherical shape of each one of the plurality of powder particles includes a flat surface portion enabling the powder particles to abut one other. At least a subplurality of the plurality of powder particles each further include a magnetic dipole to further enhance at least one of clustering or separation of the subplurality of powder particles.

In still another aspect the present disclosure includes a plurality of powder particles configured to be joined in an additive manufacturing process to form a part. Each one of the powder particles may comprise a determined three dimensional, non-spherical shape. The non-spherical shape of each one of the plurality of powder particles includes a flat surface portion enabling the powder particles to abut one other. At least a subplurality of the plurality of powder particles each further include a surface coating on at least a portion thereof to further enhance at least one of clustering or separation of the subplurality of powder particles.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which.

DETAILED DESCRIPTION

Example embodiments will now be described more fully with reference to the accompanying drawings.

The present disclosure involves systems and methods for tailoring one or more of the shape, size, composition, and surface properties of one or more types of particle for powder-based AM methods. Particles designed using the teachings presented herein can significantly reduce porosity in a finished AM manufactured part, aide agglomeration of particles during a fusing or melting process while making the part, and improve control over gradients in material composition within the finished part. The net effect is to improve the final part to more closely match the ideal properties assumed in its design. Tailored particles can additionally help the additive manufacturing process itself, for example, by improving thermal management in SLM, allowing for quicker solidification of parts and improved surface finish. Thus, the design of the printing process can also be improved.

Tailoring the design of the powder particles can additionally enable the use of powder-based AM methods in environments where they would otherwise not be possible or practical, for example in the reduced gravity or microgravity found on the Moon or in Earth orbit, respectively. Reuse or recycling of a part when it is no longer needed can also be facilitated by tailored particles, allowing it to be decompiled into granular feedstock with lower energy and cost than traditional approaches.

The present disclosure involves the creation of powder particles having shapes and characteristics making them ideally suited for improving densification in powder-based additive manufacturing applications. By controlling one or more important characteristics including particle shape, particle size, and particle surface properties and/or material characteristics, the particles may be optimized for use in creating a wide range of 3D AM-created parts and structures. Replacing spheroidal particles by particles with non-spherical, but controlled shapes, allows the latter to pack with significantly improved density, and potentially up to 100% density to virtually eliminate voids within the finished 3D part.

Figure 1:
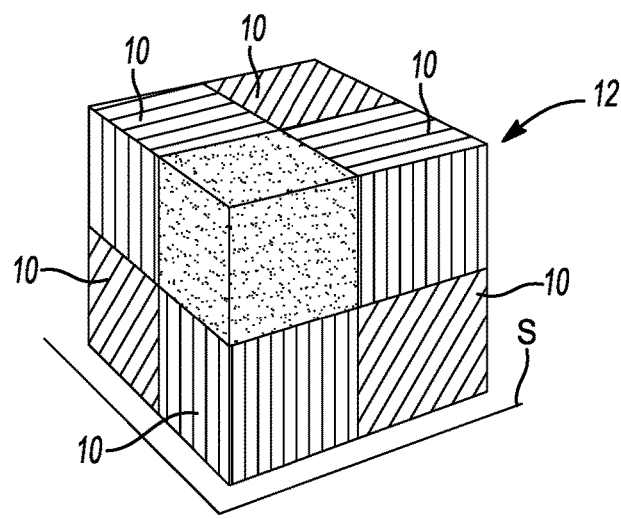
FIG. 1 is a perspective view of one shape of powder particles in accordance with the present disclosure, which theoretically enables up to 100% densification in a finished 3D AM part or structure.

Referring to FIG. 1, powder particles 10 in accordance with one embodiment of the present disclosure are shown. The powder particles 10 in this example are made exclusively from identical, cubical, square-shaped particles having the same dimensions. The square-shaped particles 10 pack with potentially up to 100% density when deposited as a powder layer on a support table or surface "S" during an AM process just prior to heating, and can be used to form a larger structure 12 of virtually any desired shape and dimensions when fused or melted together. The particles 10 may all be of exactly the same material composition or may differ slightly in composition depending on the needs of the finished 3D part. Potentially, the dimensions of the particles 10 could be varied while still achieving potentially up to 100% density. The particles 10 can be tailored to provide a varying degree of porosity through the part, if a variable porosity is desired in the finished 3D part. Variable porosity may be achieved by either using particles of varying porosity, by using particles of different materials, or through a combination of both processes. For example, one could use micron-scale particles with nanoscale porosity which could be preserved, for example, during a sintering operation. One could also use particles of the same shape but differing compositions, such that one would expect a slight volumetric change in, say, one of the types of particles, due to a phase change during a melting operation, for example, by a steel alloy converting from a martensitic to a perlitic form after melting. Also, sintering or binder-jetting could be used to join particles with shapes intentionally chosen to pack with less than 100% density, as for example spheres if their packing density matched the desired final density (or porosity).

In this regard it will be appreciated that the term "part" or "3D" part as used herein includes any form of 3D "structure" which can be manufactured using an AM process but which might not normally be termed or viewed as a "part".

Figure 2:
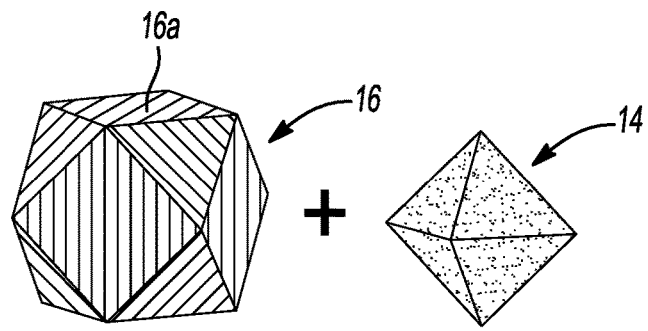
FIG. 2 is an isometric illustration of two additional differently shaped powder particles which are designed such that, when used together in an AM process, can create a larger 3D structure of virtually any dimension while providing up to theoretically 100% densification in the finished 3D part.
Figure 2:
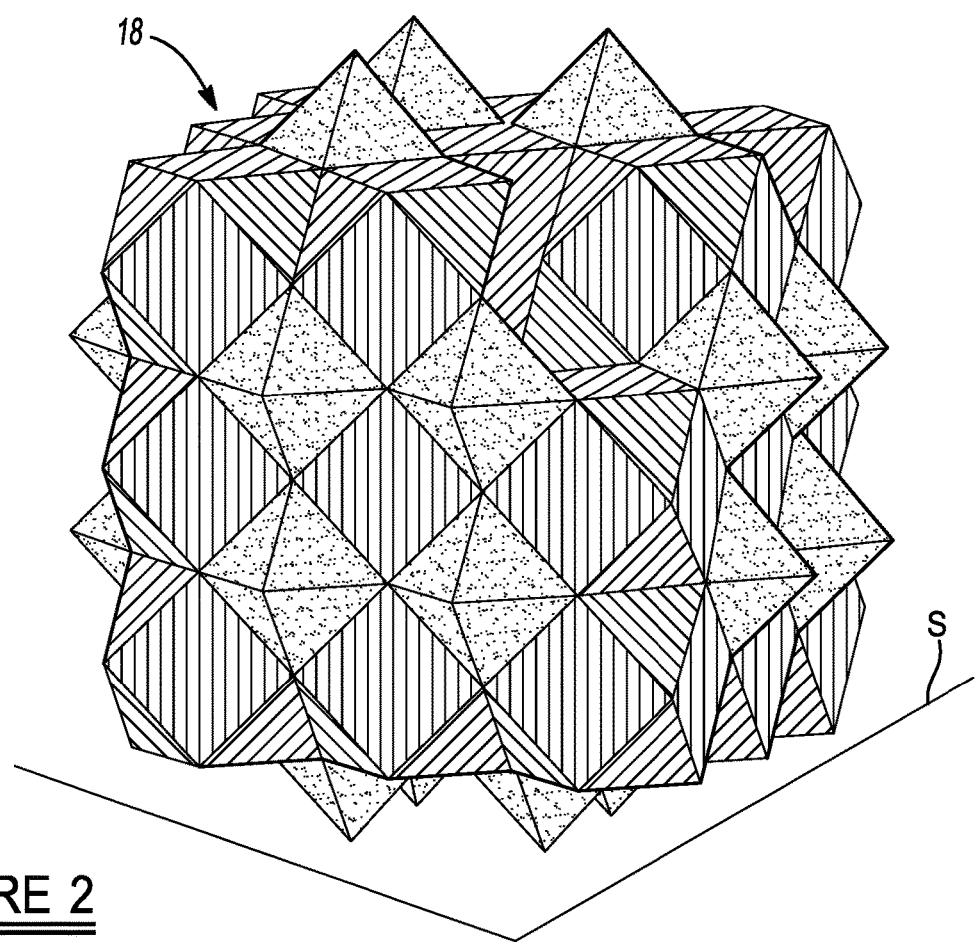
Figure 2A:
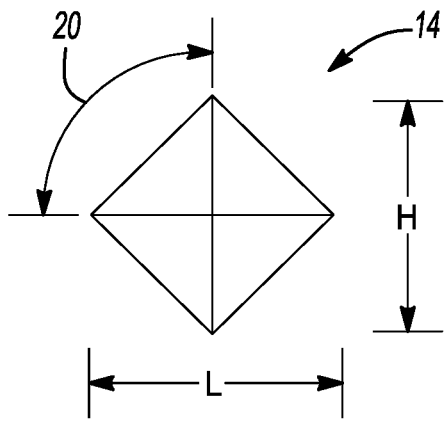
FIG. 2a is a diagram illustrating one example of the dimensions for an octahedral particle in order to enable fitting in with the cuoboctahedral particles shown in FIG. 2.

FIG. 2 shows another embodiment of the powder particle design of the present disclosure in which two differently, but at least partially complementary, shaped particles 14 and 16 are used to form a larger structure 18 on the support structure S. The particles 14 and 16 in this example are shaped as octahedral (powder particle 14) and cuoboctahedral (powder particle 16) shaped particles, which form at least partially complementary 3D shapes. FIG. 2a shows the octahedral particle 14; its wall angles 20 are selected to match the wall angles 16a (see FIG. 2) of the cuoboctahedral 16 so that a perfect fit can be achieved. The particles 14 and 16 are also made of dimensions which enable eight ones of the particles 16 to be fitted in abutting relationship around one of the particles 14 without creating any voids, and such that the octahedral particle 14 is fully encased within eight ones of the cuoboctahedral. In this example, that is achieved by making the octahedral particle 14 with the same height "H" and length "L" dimensions (FIG. 2a), and such that the H and L dimensions are one-half of the overall L and W dimensions of the cuoboctahedral particles 16. As seen in FIG. 2, each octahedral particle 14 is perfectly encased with no voids or gaps between eight cuoboctahedral particles 16.

Figure 3:
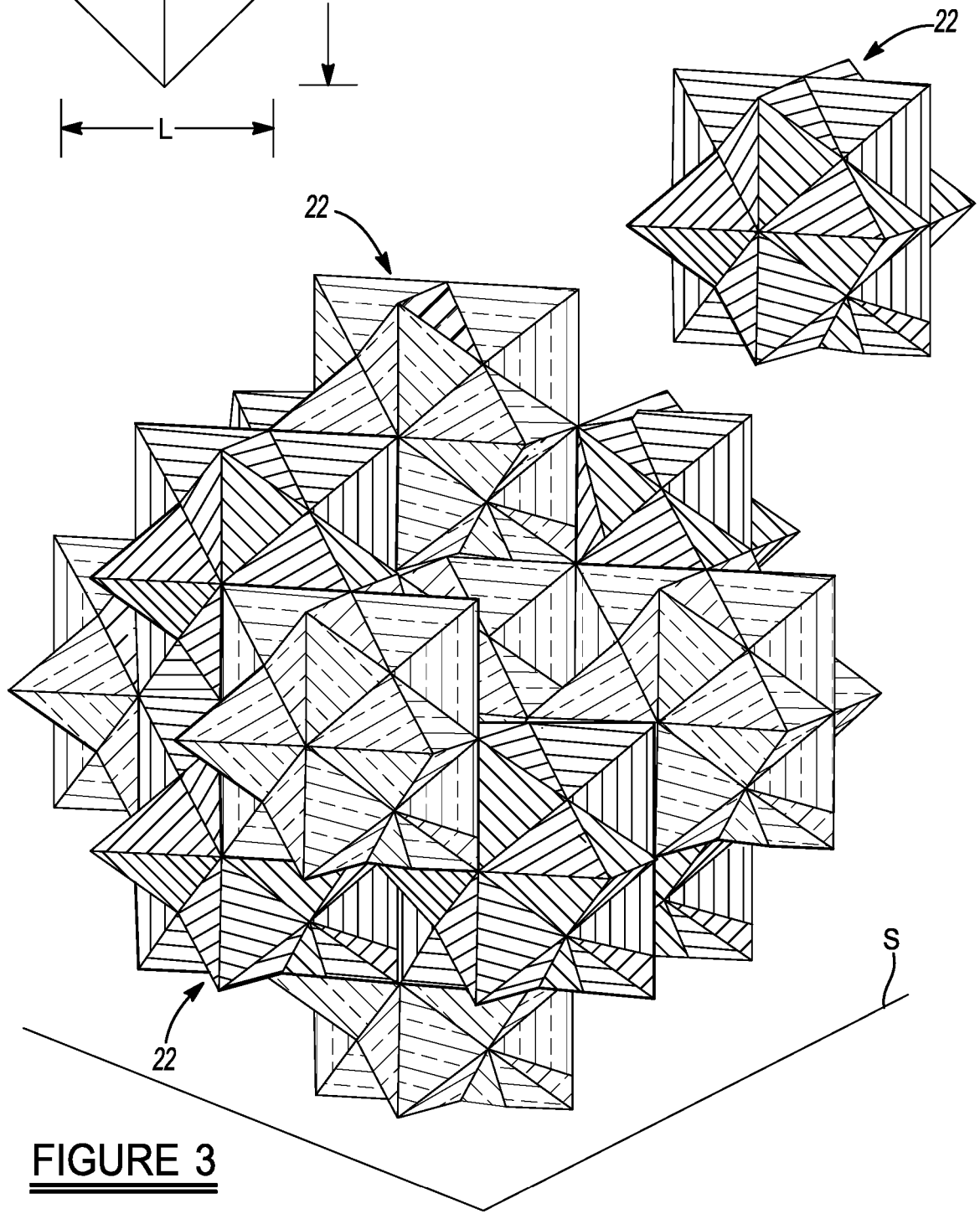
FIG. 3 is an isometric illustration of another powder particle in accordance with the present disclosure being used to form a 3D part, which in this example makes use of first stellations of rhombic dodecahedra, which fit together to form a 3D part with theoretically up to 100% densification.

It will be appreciated that a number of other particle shapes, either all of the same shape or having different shapes, may be constructed such that they are easily fit together to form a larger structure with few or zero voids. FIG. 3 shows another particle design 22 in accordance with the present disclosure. The particle 22 forms a non-convex stellation of the rhombic dodecahedron. The particles 22 may be identical in construction and fit together in an interlocking manner with virtually zero voids. In this example the particles 22 all have exactly the same dimensions, however, it is possible that the dimensions of the particles 22 could be varied while still enabling them to fit together with theoretically up to 100% density. In FIG. 3 the particles 22 are fitted together on a support structure S by shifting them one-half of their length or height dimension relative to an immediately adjacent particle 22, along each layer. Powders comprised of such particles may be fully-dense before the additive manufacturing process per se begins, that is, before a laser is turned on in SLM process, or may become fully-dense during the AM process, such as in an EPD process. Such fully dense solids eliminate porosity in the finished part, which increases the strength of the finished part, as well as its expected lifespan, its heat conduction, and potentially other performance metrics or characteristics of the finished part. The finished part will also better match the ideal case properties assumed in the design of the part, meaning that the "as-built" part more closely achieves is predicted performance. This in turn may lead to faster certification of AM parts in critical applications, for example with airborne structures.

In addition, a fully-dense powder bed under the melt pool of AM processes like the SLM process improves the heat conduction away from the melted material, solidifying it faster. This results in a faster overall manufacturing process, particularly if the walls around the powder bed are plumbed to act as a heat sink. Furthermore, a present day surface finish limitation of the SLM process results from the high mismatch in thermal conductivity between the solidified regions and the powder regions in previous layers in the build volume. Reducing the mismatch in thermal conductivity by using densified powders significantly reduces, and in some instances may even completely eliminate, this thermal conductivity mismatch. The elimination of the thermal conductivity mismatch can be expected to improve surface finishes, and thus the need for post-processing (polishing, etc.) after the additive manufacturing.

Still another approach to achieving fully-dense powders is to tailor the size distribution of the particles. Even for spheroidal shapes, a carefully chosen size distribution can achieve nearly 100% density in a finished 3D part by mixing particle sizes, for example, as in the Apollonian gasket problem (i.e., a fractal design in which a circular domain is 100% filled with smaller circles of varying sizes).

When spatially-tailored micro porosity is a desirable feature, e.g. for parts through which a fluid phase will percolate, then the control of the size(s) and shapes(s) of the particle(s) in the powder are tuning parameters that can be chosen to achieve gradients in porosity below the particle size, laser spot size, or other processing parameters. The use of particles which themselves are highly porous, as created for example by removal of a sacrificial phase, allows one to create hierarchical porosity. Three dimensional parts with a hierarchical porosity are expected to be important in applications involving bio-compatible materials, since structures made from bio-compatible materials mimic natural materials like bone, pulmonary alveoli, and so forth.

Selective or spatially-varying functionalization of the powder particles provides another axis of control of the powder particles. For example, creating a magnetic dipole moment on each powder particle allows the particles to be aligned during fabrication by the application of an external magnetic field. This may be either be an integral part of the AM process, as in EPD, or an additional method of control by which aligning powder particles to be adhered in a binder jet method. For example, an external magnetic field could be used to align the particles as they are being added to the build volume of an AM machine before the solidification step begins. For example, an oscillating magnetic field could be used to help align the fresh layer of powder with previously-deposited layers. Such functionality could also be used to improve alignment under shear, e.g., when the powder particles are delivered to the build area or to the part itself by a tube, nozzle, or other such channel that would impose shear on the granular medium, as is the case in DIW methods. Such shear alignment would allow a free-flowing colloidal ink to be deposited as a near-net-shape part within a build volume, with the particles aligned yet separated by the ink's solvent. The solvent could then be evaporated, leaving densely-packed, aligned particles, which could then be solidified by various means, including heat treatment, RF welding or other methods.

Figure 4:
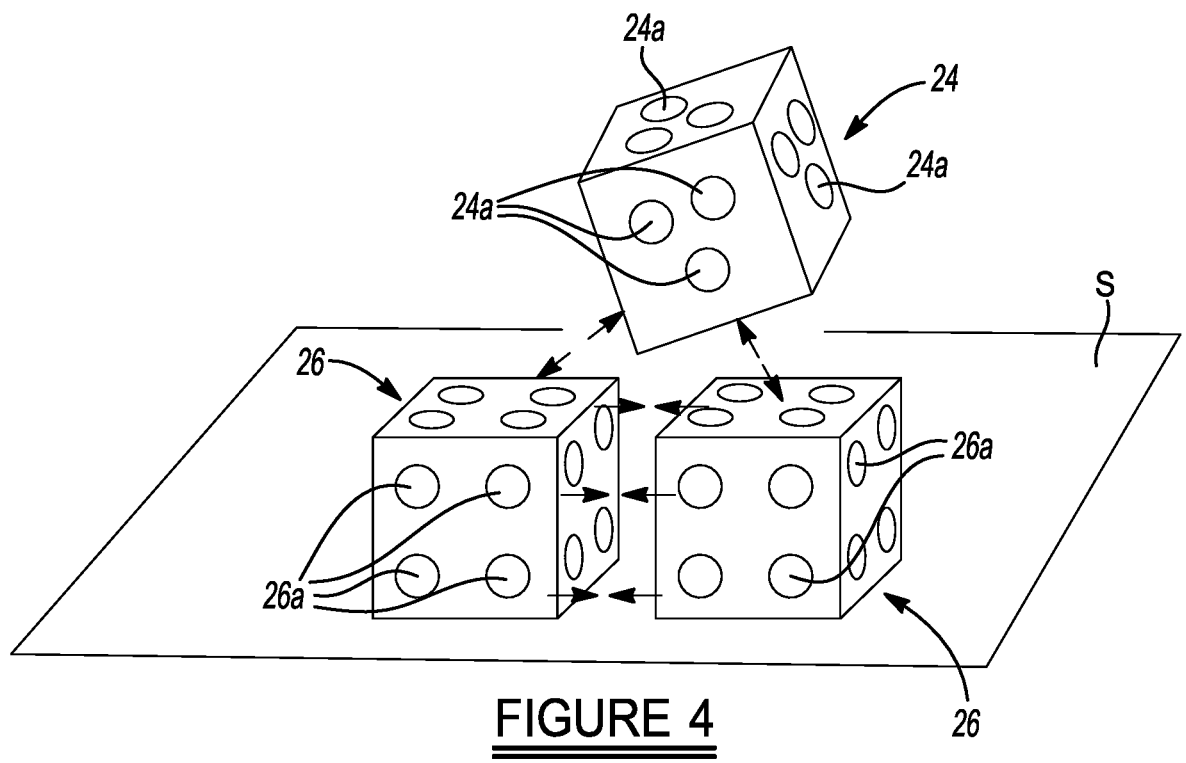
FIG. 4 shows another embodiment of the present disclosure which makes use of self-aligning, self-assembling cubes with patterned complex magnetic polarizations on their faces, enabling the cubes to bond together in desired orientations to form a 3D part with theoretically up to 100% density.

Complex magnetic polarization of the particle surfaces is another construction/methodology that enables tailored particle matching to facilitate particle alignment and dense packing. For example, FIG. 4 shows another embodiment of the present disclosure in which particles 24 and 26 are of the same shape, but particle 24 has magnet dipole moments 24a1 which are arranged differently from magnetic dipole moments 26a1 of particles 26. This enables particles 26 to be attracted to one another because of their magnetic dipole moments, while particle 24 is repelled from the particles 26 (because of differing/repulsive magnetic dipole elements). This enables self-assembly and self-alignment of the particles in an ordered arrangement on the support structure S which achieves a highly dense (up to or including 100% densification). Thus, patterns and structures can be formed, even in a powder bed, before the AM joining process (i.e., melting or fusion of particles through heat) has begun. Means to reduce the energy barrier to such pattern or structure formation may include, but are not limited to, the addition of a wetting agent, application of a vibration signal, application of heat, flowing a gas through the powder particles, solvent evaporation-driven assembly and steady or oscillatory shear.

The particles may be constructed by growing them with nanoscale control over feature sizes, for example by photoresist silicon wafer patterning. Such patterning may also be used to produce particles which have pits on one or more surfaces. Using such silicon wafer patterning, and then adding magnetic material in the pits, provides the magnetic dipoles required to control attraction and repulsion of the different types of particles.

It will be appreciated that other approaches to forming particles with magnetic or other functionalized surfaces exist. Within the academic literature, these are known as "patchy particles" and have been formed, for example, by colloidal fusion (see, e.g., Gong et al., Nature 550, October 2017). These known fabrication processes may potentially be applied in manufacturing powder particles for AM applications.

Another approach would be to use AM processes which can fabricate with two or more materials simultaneously. One would then build both the main body of the particle as well as the magnetic or other functionalized pattern at once. Multi-material projection micro-stereolithography is one such approach and may be used to print such particles in the tens to hundreds of microns size range. Still another approach may be to make the particles with prescribed nanoscale porosity, then wicking a magnetic material precursor (e.g., in solution) through these pores.

While the illustration of FIG. 4 shows square shaped particles 24 and 26a/26b being used, it will be appreciated that the use of selectively positioned magnetic dipoles is not limited to use with only square shaped particles. For example, pyramidal, octahedral, cuboctahedral, or other shapes of particles may be incorporated, and two or more differently shaped particles may be used as well, with selective magnetic dipole arrangements which facilitate alignment and aggregation/clustering of the particles in a desired order, or repulsion of different types of particles or particles of different shapes. Still further, the use of magnetic dipoles on some particles may be combined with the use of particles which have no dipoles, to achieve different degrees of density throughout a part. The use of magnetic dipoles may also be combined with material selection of different types of particles to cause aggregation/clustering of materials of different constructions, and/or separation of materials of different types of constructions, to thus tailor a specific performance aspect (e.g., strength, porosity; flexibility, etc.) of the finished 3D part.

The introduction of controllable magnetic binding between particles additionally enables the use of powder-based AM methods in environments where the use of powders would otherwise be impractical or impossible. One such case is in low gravity environments, such as one would find at a colony on the Moon or on Mars, where the lower-than-Earth gravity may be insufficient to pack a powder bed, e.g., for an SLM method, without unacceptably high porosity. This porosity will be remedied by self-assembling, densely packing particles as describe above. Another such case is in microgravity ("zero gravity"), such as one would find aboard a space ship in Earth orbit, or in transit from Earth to Mars. Here, a traditional powder bed would be impossible to form since it would not settle into the bed but would instead float above or around it. The introduction of controllable magnetic or other binding between the particles, and possibly between the particles and the bed, allows the formation of such a bed, and would additionally make handling of the powder safe since it would not float throughout the space ship interior.

Selectively coating particles with compounds that promote or inhibit agglomeration allows further control over the "as-built" part via powder patterning. For example, selectively coating some particles but not others with a heat-setting adhesive, or with different solders that melt at varying temperatures, and distributing these selected particles spatially, allows for the creation of a solid part without using directed energy like SLM, by simply heating the build area (for example with isostatic compression). This also enables the manufacture of parts by novel means, for example, by deformation of the entire build volume of metal powder as in roll welding, or by solvent or RF welding of polymers when inhibitors are spatially distributed.

Additionally, such spatially-distributed compounds could serve to improve the reusability or recyclability of the part back into its granular feedstock. Consider for example a solder with a particular stoichiometry which partially melts at one temperature, agglomerating nearby particles and forming a solid part when cooled. Then when the part is no longer needed, it is heated to a higher temperature, melting a solid phase in the solder with an accompanying volumetric change, leading to re-pulverization of the part back into granular feedstock. This decomposition directly back into the AM feedstock would require less energy and cost than forming new feedstock from solid material, and additionally would allow for a reduction in the amount of feedstock that would need to be kept in inventory in applications where space and weight are at a premium, e.g., in submarines on extended patrols, space missions, and the like. The capability of the binding phase to have a secondary, de-adhesive, property is not limited to solders, or to activation by temperature. Other examples include an adhesive that, once activated, is susceptible to a chemical etchant, or a chemical composition that generates a brittle phase under high hydrostatic pressures, allowing for the particles to be easily broken apart.

In one or all of the above described embodiments, it may be desirable to construct the support structure S on which the particles are placed to allow the support structure to be vibrated for a short time (e.g., a few seconds or longer) to help settle the particles into a densely packed configuration, before applying heat to melt or fuse the powder particles together in an AM process.

It will also be appreciated that the sizes of the particles described herein may vary widely to meet the needs of a specific application, but it is expected that in many applications the particles will be constructed with a size on a scale of tens of hundreds of microns.

The teachings of the present disclosure enable particles to be formed which can provide a tailored porosity for the finished part; that is, some portions of the part may have a greater or lesser degree of porosity than others. The porosity can be used to control some other quality or characteristic of the part, for example fluid percolation through the part or through different sections of the part.

The present disclosure thus provides particle design and construction which significantly improve the residual porosity, residual stress, gradients in material composition, particle alignment, and fidelity to as-designed plans. The powder particles described herein achieve these benefits regardless of the type, size, or composition of the part being fabricated, and regardless of the powder-based AM process being used.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A plurality of powder particles configured to be joined in an additive manufacturing process to form a part, each one of said plurality of powder particles comprising:
    a determined three dimensional, non-spherical shape;
    the plurality of powder particles further being of dimensions enabling fitting individual ones of the plurality of particles in abutting relationship with one another; and
    at least a subplurality of the plurality of powder particles each further including a functionalized surface feature to enhance and promote at least one of attraction and clustering of, or separation of, the subplurality of the plurality of powder particles.

2. The plurality of powder particles of claim 1, wherein the functionalized surface feature comprises magnetic dipoles located on each one of the subplurality of powder particles.

3. The plurality of powder particles of claim 2, wherein all of the magnetic dipoles have the same polarity, to facilitate separation of the subplurality of powder particles.

4. The plurality of powder particles of claim 2, wherein the magnetic dipoles have different polarities to enhance clustering of the subplurality of powder particles.

5. The plurality of powder particles of claim 2, wherein at least some of the subplurality of the plurality of powder particles include a pair of the magnetic dipoles on different surface portions thereof.

6. The plurality of powder particles of claim 5, wherein each said pair of the magnetic dipoles includes a dipole of a first polarity, and a dipole of a second polarity opposite the first polarity.

7. The plurality of powder particles of claim 2, wherein each one of the subplurality of the plurality of powder particles has pits formed on surface portions thereof, and the magnetic dipoles are disposed in the pits.

8. The plurality of powder particles of claim 2, wherein each one of the subplurality of the plurality of powder particles has pores forming a nanoscale porosity, and a magnetic material precursor is deposited in the pores to form the magnetic dipoles.

9. The plurality of powder particles of claim 1, wherein at least some of the plurality of powder particles:
    have a square shape;
    have a rectangular shape;
    have a pyramidal shape;
    have an octahedral shape; or
    have a cuboctahedral shape.

10. The plurality of powder particles of claim 1, wherein the plurality of powder particles all have the same shape.

11. The plurality of powder particles of claim 1, wherein the plurality of powder particles all have the same dimensions.

12. The plurality of powder particles of claim 1, wherein the functionalized surface feature comprises a coating.

13. The plurality of powder particles of claim 12, wherein the coating comprises a heat setting adhesive.

14. The plurality of powder particles of claim 13, wherein the heat setting adhesive is susceptible to chemical etching.

15. The plurality of powder particles of claim 12, wherein the coating comprises a solder.

16. The plurality of powder particles of claim 12, wherein the coating comprises different solders applied to different ones of the subplurality of the plurality of powder particles, the different solders configured to melt at different temperatures.

17. The plurality of powder particles of claim 1, wherein the functionalized surface feature comprises a chemical composition that generates a brittle phase when subjected to a hydrostatic pressure, allowing for ones of the plurality of powder particles that have agglomerated together in a previous manufacturing phase to be readily broken apart in a subsequent operation.

18. The plurality of powder particles of claim 1, wherein at least some of the plurality of powder particles have a size on a scale of tens of hundreds of microns.

19. The plurality of powder particles of claim 1, wherein at least some of the plurality of powder particles are at least one of identical in three dimensional shape or at least partially complementary in three dimensional shape to each other.

* * * * *